United States Patent [19]
Reed

[11] Patent Number: 4,997,412
[45] Date of Patent: Mar. 5, 1991

[54] NON-SYNCHRONOUS SHIFTING HYDROMECHANICAL STEERING TRANSMISSION

[75] Inventor: Bradley O. Reed, Pittsfield, Mass.

[73] Assignee: General Electric Company, Pittsfield, Mass.

[21] Appl. No.: 456,415

[22] Filed: Dec. 26, 1989

[51] Int. Cl.$^5$ ............................................. F16H 37/06
[52] U.S. Cl. ............................................ 475/24; 475/72
[58] Field of Search ...................... 475/24, 23, 22, 21, 475/18, 72, 78, 83; 180/6.48, 6.3

[56] References Cited

U.S. PATENT DOCUMENTS

| | | | |
|---|---|---|---|
| 2,580,946 | 1/1952 | Orshansky et al. | 475/24 |
| 3,538,790 | 11/1970 | Polak | 475/24 |
| 3,590,658 | 7/1971 | Tuck | 475/24 |
| 3,777,593 | 12/1973 | Mooney, Jr. et al. | 74/687 |
| 3,815,698 | 6/1974 | Reed | 180/6.48 |
| 4,164,156 | 8/1979 | Reed | 74/687 |
| 4,183,264 | 1/1980 | Reed | 475/24 |
| 4,258,585 | 3/1981 | Orshansky et al. | 475/24 |
| 4,327,603 | 5/1982 | Zaunberger et al. | 475/22 |
| 4,505,168 | 3/1985 | Booth et al. | 475/23 |
| 4,614,131 | 9/1986 | Hall, III | 74/687 |
| 4,614,132 | 9/1986 | Hall, III | 475/22 |
| 4,637,275 | 1/1987 | Whalen | 475/72 |
| 4,663,987 | 5/1987 | Maruyama et al. | 475/24 |
| 4,682,515 | 7/1987 | Reed | 74/687 |
| 4,799,401 | 1/1989 | Reed | 74/677 |
| 4,848,186 | 7/1989 | Dorgan et al. | 475/24 |

FOREIGN PATENT DOCUMENTS 0698824  11/1979  U.S.S.R. .................. 475/18

Primary Examiner—Dwight Diehl
Assistant Examiner—Daniel Wittels
Attorney, Agent, or Firm—Bailin L. Kuch; Robert A. Cahill

[57] ABSTRACT

An infinitely variable speed hydromechanical steering transmission includes a range-changing mechanism flanked by a pair of hydrostatic units which are commonly driven by a mechanical input to produce respective mechanical and hydrostatic outputs. These outputs are combined in left and right output planetary gear sets which are interconnected by a cross-shaft extending centrally through the range-changing mechanism and hydrostatic units. The range-changing mechanism includes a plurality of clutches and brakes that are selectively engaged in pairs to incrementally change the mechanical output speed on the cross-shaft and thus to operate the transmission in a plurality of forward and reverse speed ranges. Each range change is accomplished by a step change in the hydrostatic outputs.

19 Claims, 2 Drawing Sheets

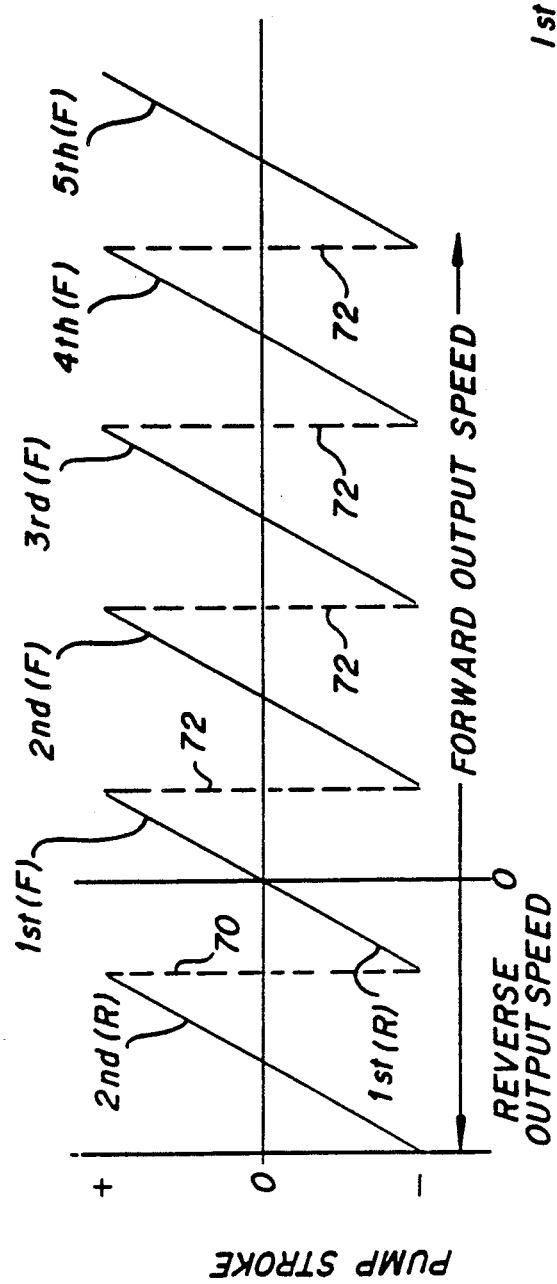

NON-SYNCHRONOUS SHIFTING HYDROMECHANICAL STEERING TRANSMISSION

FIELD OF THE INVENTION

The present invention relates to hydromechanical transmissions and particularly to multi-range, infinitely variable, hydromechanical transmissions for track-laying or skid-steered vehicles.

BACKGROUND OF THE INVENTION

In multi-range hydromechanical steering transmissions of the synchronous shifting type, such as exemplified in applicant's U.S. Pat. Nos. 4,682,515 and 4,799,401, two hydrostatic drive units are uniformly stroked in one direction to accelerate through one transmission output range, and, upon shifting to the next higher transmission output range, the hydrostatic drive units are uniformly stroked in the opposite directions to accelerate through this higher range. To effectively implement such synchronous range shifting without changing hydrostatic unit stroke, a steer-cancelling or hydrostatic output speed averaging gear train is required. This gear train includes a shaft which normally extends through the central openings in the hydraulic pump and motor set of each hydrostatic unit. Consequently, the main transmission cross-shaft interconnecting the left and right output combining sets must be located elsewhere. This renders synchronous-shifting, hydromechanical steering transmissions somewhat bulky and thus difficult to package within modern track-laying or skid-steered vehicles with their stringent space and weight limitations.

SUMMARY OF THE INVENTION

It is accordingly an object of the present invention to provide an improved hydromechanical steering transmission.

A further object is to provide a hydromechanical transmission of the above-character, which is capable of operating at infinitely variable speeds within each of a multiplicity of speed ranges.

An additional object is to provide a hydromechanical transmission of the above-character, which is exceptionally compact in size and light in weight, requires a minimal number of parts, is economical in construction, and is highly efficient in operation.

Other objects of the invention will in part be obvious and in part appear hereinafter.

In accordance with the present invention, there is provided a hydromechanical steering transmission having a pair of hydrostatic units for producing separate hydrostatic outputs which are applied to respective left and right output combining gear sets. A range-changing mechanism is located between the two hydrostatic units and is commonly driven with the hydrostatic units from a mechanical input drive train to produce a mechanical output which is applied to the combining gear sets via a cross-shaft extending centrally through the hydrostatic units. The range changing mechanism includes multiple brakes and clutches which are selectively engaged and disengaged to incrementally change the mechanical output speed on the cross-shaft and thus to shift from speed range to speed range. Infinitely variable transmission output speed within each range is provided by uniformly varying the strokes or displacements of the hydrostatic units whose hydrostatic outputs are combined with the mechanical output in each output gear set to produce both straightline propulsion and steer. Each range change includes an abrupt or step change in stroke of the hydrostatic units, and thus range-changing is non-synchronous in character.

The invention accordingly comprises the features of construction, combination of elements, and arrangement of parts, all of which as described hereinbelow, and the scope of the invention is indicated in the appended claims.

BRIEF DESCRIPTION OF THE DRAWINGS

For a full understanding of the nature and objects of the invention, reference may be had to the following Detailed Description taken in conjunction with the accompanying drawings, in which:

FIG. 2 is a table setting forth the conditions of the various clutches and brakes necessary to establish the various operating speed ranges of the transmission of FIG. 1; and FIG. 3 is a graph illustrating the stroking pattern executed in the hydrostatic units of the transmission of FIG. 1 to achieve range shifting and infinitely variable transmission output speed within each range.

Corresponding reference numerals refer to like parts throughout the several views of the drawings.

DETAILED DESCRIPTION

Figure 1:
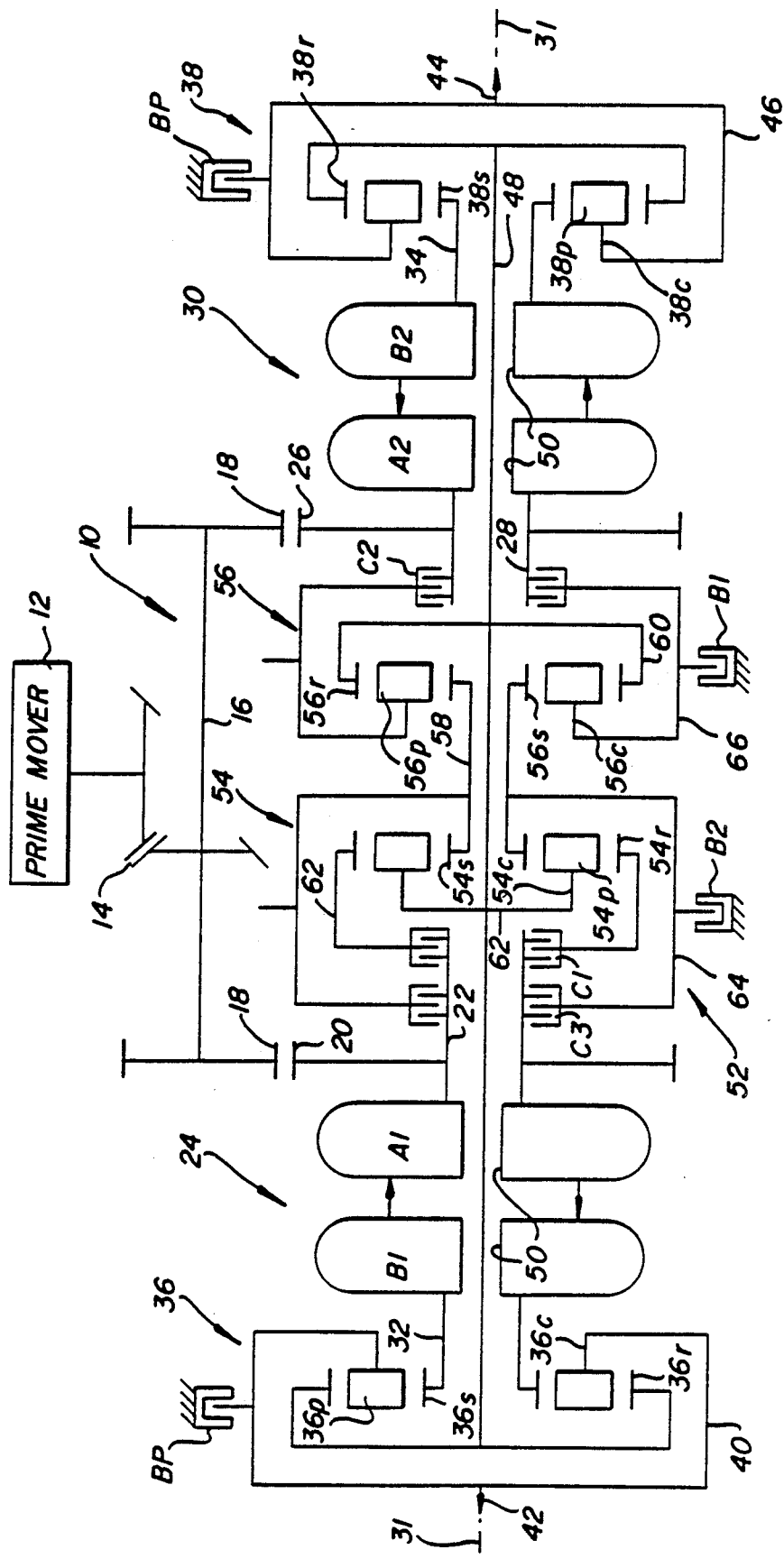
FIG. 1 is a schematic diagram of a multi-range, infinitely variable, hydromechanical steering transmission constructed in accordance with the the present invention.

The hydromechanical steering transmission of the present invention, includes, as seen in FIG. 1, an input drive train, generally indicated at 10, which is mechanically driven at or near constant speed by a prime mover 12, such as the diesel or gas turbine engine of a track-laying or skid-steered vehicle, not shown. This mechanical input drive train includes bevel gearing 14 for applying the prime mover mechanical input to a shaft 16 carrying transfer gears 18 at each end. One transfer gear meshes with a gear 20 to impart mechanical drive to a sleeve shaft 22, constituting the input shaft to a hydrostatic unit, generally indicated at 24. Similarly, the other transfer gear 18 meshes with a gear 26 to drive a sleeve shaft 28 serving as the input shaft of an identical hydrostatic unit generally indicated at 30. Sleeve shafts 22 and 28 are concentric with transmission centerline 31.

Hydrostatic unit 24 includes a hydraulic pump A1 and a hydraulic motor B1, while hydrostatic unit 30 includes a hydraulic pump A2 and a hydraulic motor B2. These pumps and motors may be of the ball piston type such as disclosed in Applicant's U.S. Pat. No. 3,815,698. While both the hydraulic pump and hydraulic motor may be adapted to provide infinitely variable displacements or capacities, preferably each pump is constructed as a variable capacity, positive displacement ball piston pump, and each motor as a fixed capacity, positive displacement ball piston motor in closed hydraulic circuit relationship with its associated pump. The hydraulic motors B1, B2 can thus be made to turn at infinitely variable speeds in either direction corresponding to the capacity or displacement settings of their variable pumps A1, A2 and thereby produce hydrostatic outputs on their respective output sleeve shafts 32, 34 varying over a range of speeds from full forward to full reverse. These output shafts are also concentric with the transmission centerline.

Still referring to FIG. 1, the hydrostatic output of unit 24 on shaft 32 drives the sun gear 36s of a left output planetary gear set, generally indicated at 36. Similarly, the hydrostatic output of unit 30 on shaft 34 drives sun gear 38s of a right output planetary gear set, generally indicated at 38. Carrier 36c for planet gears 36p of planetary set 36 is connected with a drum 40 which, in turn, is drivingly connected with the left transmission output shaft 42. The right transmission output shaft 44 is driven off carrier 38c for planet gears 38p of planetary set 38 via a drum 46. Brakes BP are provided to ground drums 40, 46, and thus serve as stopping and parking brakes. The ring gears 36r and 38r of the two output planetary gear sets are rigidly interconnected by the main transmission cross-shaft 48. It is seen that this cross-shaft is aligned with the transmission centerline, as are output shafts 42, 44, and extends through central openings, indicated at 50, in the hydraulic pumps and motors of hydrostatic units 24 and 30.

Centrally located in the transmission intermediate hydrostatic units 24 and 30 is a range changing mechanism, generally indicated at 52. As will be seen, this mechanism produces a mechanical output of incrementally varying speeds on cross-shaft 48, which is combined with the hydrostatic output on shaft 32 in left output planetary gear set 36 and with the hydrostatic output on shaft 34 in right output planetary gear set 38 to produce hydromechanical outputs on transmission output shafts 42 and 44 for straight-line and steer vehicle propulsion in a multiplicity of forward and reverse speed ranges.

Thus, range changing mechanism 52 includes a pair of planetary gear sets, generally indicated at 54 and 56, which are interconnected in a Simpson configuration. That is, sun gears 54s and 56s are interconnected by a sleeve shaft 58 concentric with cross-shaft 48. Ring gear 56r is rigidly connected to the cross-shaft through a drum 60, and carrier 54c for planet gears 54p is rigidly connected to the cross-shaft via a drum 62. Thus, ring gear 56r of planetary set 56 is tied to carrier 54c of planetary set 54 through cross-shaft 48 in Simpson gear train fashion.

The mechanical input of drive train 10 applied to sleeve shaft 22 is selectively introduced through a clutch C1 and drum 62 to ring gear 54r of planetary set 54 and to common sleeve shaft 58 for sun gears 54s, 56s of both planetary sets via a clutch C3 and drum 64. The mechanical input, also appearing on sleeve shaft 28, is introduced to carrier 56c for planet gears 56p of planetary set 56 by way of clutch C2 and drum 66. A brake B1 is utilized to ground drum 66 and thus inhibit rotation of carrier 56c, while a brake B2 is engaged to ground drum 64 and thus inhibit rotation of sun gears 54s, 56s. As described below and as illustrated in FIG. 2, these brakes and clutches are selectively engaged in multiples of two pursuant to operating the transmission in its various forward and reverse speed ranges.

Specifically, to operate the transmission in its first forward and reverse speed range 1st(F)/(R), clutches C1, C2 and C3 are disengaged, while brakes B1 and B2 are engaged. Thus, mechanical input drive train 10 is disconnected from range changing mechanism 52, and, with brakes B1 and B2 engaged, carrier 56c and sun gears 54s, 56s are grounded. Mechanism 52 is locked up to inhibit rotation of cross-shaft 48, as well as ring gears 36r and 38r of output planetary gear sets 36 and 38. It is seen that the only inputs to the output planetary gear sets are the hydrostatic outputs on sun gears 36s and 38s, and thus range 1st(F)/(R) is strictly a hydrostatic propulsion range. Uniform stroking (displacement change) of hydraulic pumps A1, A2 in the positive direction drives these sun gears in the forward direction to produce infinitely variable speed, first range forward propulsion, and uniform stroking in the negative direction drives these sun gears in the opposite direction to produce infinitely variable, first range reverse propulsion, all as illustrated in FIG. 3. At any straightline propulsion pump stroke, differential stroking of the pumps, typically in equal and opposite directions, produces first range vehicle steer.

To operate in a second, reverse speed range 2nd(R), brake B2 is released, and clutch C3 is engaged. Sun gears 54s and 56s of the range changing mechanism are driven at the speed of mechanical input drive train 10 appearing on sleeve shaft 22, while carrier 56c is grounded. Cross-shaft 48 and ring gears 36r and 38r of the output planetary gear sets are driven in a reverse direction at the sun gear to ring gear reduction of planetary gear set 56 in range changing mechanism 52. This mechanical output is combined with the hydrostatic outputs of units 24, 30 in the output planetary gear sets to produce hydromechanical second range, reverse propulsion at infinitely variable speeds achieved by uniform stroking of hydraulic pumps A1, A2. As seen in FIG. 3, the shift from maximum speed, first range, reverse propulsion to minimum speed, second range, reverse propulsion involves, in addition to the concurrent engagement of clutch C3 and disengagement of brake B2, an abrupt change, indicated by dash line 70, in hydraulic pump stroke from maximum straightline propulsion, negative stroke to maximum straightline propulsion, positive stroke. Typically, maximum pump stroke, both positive and negative, is set at eighty percent of the total capacity or displacement of hydraulic pumps A1, A2, thus leaving twenty percent of pump capacity available for vehicle steer. Acceleration in second, reverse range 2nd(R) is achieved by uniformly stroking the pumps from maximum straightline propulsion positive stroke toward maximum straightline propulsion negative stroke.

To shift from first, forward range 1st(F) into second, forward range 2nd(F), brake B2 is released and clutch C1 is engaged (FIG. 2) and pumps A1, A2 are abruptly stroked (dash line 72) from maximum straightline propulsion, positive stroke to maximum straightline propulsion, negative stroke. Ring gear 54r is driven at the speed of mechanical input drive train 10 on sleeve shaft 28, while carrier 56c is braked. Under these circumstances, cross-shaft 48 is driven in the forward direction as a function of the differential between the ring to sun gear ratio of planetary gear set 54 and the sun to ring gear ratio of planetary gear set 56. This mechanical input on cross-shaft 48 is combined in the output planetary gear sets with the hydrostatic units to produce infinitely variable speed, hydromechanical propulsion in range 2nd(F).

Shift from second range 2nd(F) to third range 3rd(F) is effected by again abruptly changing pump stroke (dash line 72) from maximum straightline propulsion, positive stroke to maximum straightline propulsion negative stroke, eighty percent of total pump capacity in each case, and releasing brake B1 while engaging brake B2. Ring gear 54r is driven at the mechanical input speed on sleeve shaft 28, while sun gears 54s, 56s are braked. The mechanical output on cross-shaft 48 is thus the ring to carrier reduction of planetary gear set 54 and is combined in the output planetary gear sets 36, 38 with the hydrostatic outputs of units 24, 30 to produce infinitely variable speed, hydromechanical third range forward propulsion and steer outputs on shafts 42 and 44.

To shift from maximum speed, third range forward propulsion to minimum speed fourth range (4th(F)) forward propulsion, pump stroke is again abruptly shifted from maximum positive to maximum negative straightline propulsion stroke. Concurrently, brake B2 is released and clutch C2 is engaged, as seen in FIG. 2. With both ring gear 54r and carrier 56c being driven at the mechanical speed of input drive train 10, ring gear 56r and carrier 54c are also, and cross-shaft 48 is thus in direct drive relation with the input drive train. This mechanical output of range changing mechanism 52 is combined with the hydrostatic outputs of units 24, 30 in the output planetary gear sets to produce infinitely variable speed, fourth range hydromechanical forward propulsion and steer.

Finally, to shift from fourth range 4th(F) to fifth range 5th(F), pump stroke is again abruptly changed from maximum positive to maximum negative straightline propulsion stroke, clutch C1 is disengaged and brake B2 is engaged. Sun gears 54s, 56s are thus braked, while carrier 56c is driven at the mechanical input speed. This causes ring gear 56r and thus cross-shaft 48 to rotate at a speed greater than the mechanical input speed by the carrier to ring gear ratio of planetary gear set 56. This overdrive mechanical output is combined with the hydrostatic outputs to provide an infinitely variable speed fifth range 5th(F) of hydromechanical forward propulsion and steer.

It will be appreciated that deceleration and downshifting through the multiple ranges are effected in the reverse manner from that described above and as illustrated in FIGS. 2 and 3.

From the foregoing description, it is seen that the present invention provides an infinitely variable speed hydromechanical steering transmission which is extremely compact and relatively simple in construction. By avoiding synchronous shifting, transmission cross-shaft 48 can be arranged coincident with the transmission centerline for extension through aligned central openings 50 in the hydraulic pumps and motors of hydrostatic units 24, 30 to thereby accommodate an extremely high parts density. This arrangement minimizes the number of bearings and transmission housing support walls since, with bearings on the transmission output carrier 36c, 38c, the cross-shaft and the various sun and ring gears can be left floating. Five forward and two reverse speed ranges are provided with a minimal number of components, specifically four planetary gear sets, three clutches and two brakes. This provides for very efficient operating characteristics. It will be noted particularly from FIG. 2 that shifting between adjacent ranges requires that only one brake or clutch is engaged as another brake or clutch is disengaged. This simplifies the timing and control of the brake and clutch actuations. Also to be noted is the fact that no clutches are included in the steer propulsion paths between the hydrostatic units and the output planetary gear sets, thus steering capability can not be prejudiced by clutch malfunction.

By virtue of the foregoing, it is seen that the objects set forth, including those made apparent in the Detailed Description, are efficiently attained, and, since certain changes may be made in the construction set forth, it is intended that matters of detail be taken as illustrative and not in a limiting sense.

Having described the invention, what is claimed as new and desired to secure by Letters Patent is:

1. A multi-range hydromechanical transmission for a skid-steered vehicle, said transmission including, in combination:
   A. a mechanical input drive train;
   B. first and second hydrostatic units having respective first and second input shafts commonly driven from said input drive train and respective first and second output shafts on which are produced respective first and second hydrostatic outputs;
   C. first and second output combining gear sets having corresponding first gear elements respectively driven by said first and second hydrostatic outputs, corresponding second gear elements respectively drivingly connected with a first output shaft and a second output shaft of said transmission, and corresponding third gear elements;
   D. a cross-shaft interconnecting said third gear elements;
   E. a range changing mechanism including
      1. a first planetary gear set having a first sun gear, a first ring gear, and a first planetary carrier drivingly connected with said cross-shaft,
      2. a second planetary gear set having a second sun gear drivingly connected with said first sun gear, a second ring gear drivingly connected with said cross-shaft, and a second planetary carrier;
      3. a first clutch for selectively engaging said first ring gear with said input drive train,
      4. a second clutch for selectively engaging said second planetary carrier with said input drive train;
      5. a first brake for selectively engaging said second planetary carrier to inhibit motion thereof,
      6. a second brake for selectively engaging said first and second sun gears to inhibit motions thereof,
      7. whereby, said first and second brakes are engaged to shift said transmission into a hydrostatic first forward and reverse speed range, said first clutch and first brake are engaged to shift said transmission into a second hydromechanical forward speed range, said first clutch and second brake are engaged to shift said transmission into a third hydromechanical forward speed range, and said first and second clutches are engaged to shift said transmission into a fourth hydromechanical forward speed range.

2. The transmission defined in claim 1, wherein said first and second planetary gear sets are arranged concentrically with said cross-shaft.

3. The transmission defined in claim 2, wherein said first and second hydrostatic unit input and output shafts are arranged in concentric relation with said cross-shaft.

4. The transmission defined in claim 3, wherein said first and second hydrostatic units are arranged on opposite sides of said range changing mechanism.

5. The transmission defined in claim 2, wherein said first and second combining gear sets are respectively third and fourth planetary gear sets, said first gear elements are sun gears, said second gear elements are planetary carriers, and said third gear elements are ring gears.

6. The transmission defined in claim 1, wherein said range changing mechanism further includes a third clutch for selectively engaging said first and second sun gears with said input drive train, whereby said third clutch and said first brake are engaged to operate said transmission in a hydromechanical second reverse speed range.

7. The transmission defined in claim 6, wherein said second clutch and second brake are engaged to operate said transmission in a hydromechanical fifth forward speed range.

8. The transmission defined in claim 7, wherein said first and second planetary gear sets are arranged concentrically with said cross-shaft.

9. The transmission defined in claim 8, wherein said first and second hydrostatic unit input and output shafts are arranged in concentric relation with said cross-shaft.

10. The transmission defined in claim 9, wherein said first and second hydrostatic units are arranged on opposite sides of said range changing mechanism.

11. The transmission defined in claim 1, wherein said first and second hydrostatic units each comprise an infinitely variable displacement hydraulic pump driven off said input drive train and connected in fluid drive relation with a hydraulic motor to produce said first and second hydrostatic outputs, the displacements of said hydraulic pumps being uniformly varied between predetermined positive and negative relative displacement limits to produce infinite speed variation within said second, third and fourth forward speed ranges, uniformly varied between zero displacement and said positive displacement limit to produce infinite speed variation within said first forward speed range, and uniformly varied between zero displacement and said negative displacement limit to produce infinite speed variation within said first reverse speed range, said displacements of said pumps being differentially varied to produce steer in said speed ranges.

12. The transmission defined in claim 11, wherein each said shift between adjacent said forward speed ranges is accompanied by an abrupt change in said pump displacements between said positive and negative displacement limits.

13. A hydromechanical steering transmission including, in combination:
   A. left and right output shafts transversely aligned with the centerline of said transmission;
   B. a mechanical input drive train;
   C. a first hydrostatic unit including a first infinitely variable displacement hydraulic pump and a first hydraulic motor interconnected in fluid drive relation, said first pump having a first input sleeve shaft drivingly connected with said input drive train, and said first motor having a first output sleeve shaft on which is produced a first hydrostatic output, said first input and first output sleeve shafts being in spaced transverse alignment and in concentric relation with said transmission centerline, said first pump and first motor having transversely aligned central openings;
   D. a second hydrostatic unit including a second infinitely variable displacement hydraulic pump and a second hydraulic motor interconnected in fluid drive relation, said second pump having a second input sleeve shaft drivingly connected with said input drive train, and said second motor having a second output sleeve shaft on which is produced a second hydrostatic output, said second input and second output sleeve shafts being in spaced transverse alignment and in concentric relation with said transmission centerline, said second pump and second motor having transversely aligned central openings;
   E. left and right output combining gear sets having corresponding first gear elements respectively driven by said first and second hydrostatic outputs on said first and second output sleeve shafts, corresponding second gear elements respectively drivingly connected with said left and right output shafts, and corresponding third gear elements, said first, second and third gear elements of said left and right output combining gear sets all being rotatable about said transmission centerline;
   F. a cross-shaft rigidly connected at its opposed ends to said third gear elements of said left and right output combining gear sets, said cross-shaft aligned with said transmission centerline and extending through said central openings in said first and second pumps and motors; and
   G. a range changing mechanism located between said first and second hydrostatic units and drivingly connected with said cross-shaft to produce a mechanical output thereon, said range changing mechanism including first and second planetary gear sets having planetary gear members rotatable about said transmission centerline, plural clutches selectively engagable to drivingly connect certain of said planetary gear members to said input drive train, and plural brakes selectively engagable to brake certain of said planetary gear members, thereby to shift between multiple transmission speed ranges by changing the speed of said mechanical output on said cross-shaft, each range shift being accompanied by a change in direction of said first and second hydrostatic outputs.

14. The hydromechanical steering transmission defined in claim 13, wherein said change in first and second hydrostatic output direction is achieved by abruptly stroking said first and second pumps in concert between predetermined positive and negative straight-line propulsion stroke limits.

15. The hydromechanical steering transmission defined in claim 14, wherein said gear members of said first and second planetary gear set include respective first and second sun gears, first and second ring gears, and first and second planetary carriers, said first and second sun gears being rigidly interconnected, and said first planetary carrier and said second ring gear being drivingly connected to said cross-shaft.

16. The hydromechanical steering transmission defined in claim 15, wherein said plural clutches include a first clutch for engaging said first ring gear with said input drive train and a second clutch for engaging said second planetary carrier with said input drive train, and said plural brakes include a first brake for braking said second planetary carrier and a second brake for braking said first and second sun gears.

17. The hydromechanical steering transmission defined in claim 16, wherein said first and second clutches drivingly engage one of said first and second input sleeve shafts with said first ring gear and said second planetary carrier respectively.

18. The hydromechanical steering transmission defined in claim 17, wherein said range changing mechanism includes a third clutch for engaging said first and second sun gears with one of said first and second input sleeve shafts.

19. The hydromechanical steering transmission defined in claim 18, wherein said left and right combining gear sets are respectively third and fourth planetary gear sets, said first gear elements are sun gears, said second gear elements are planetary carriers, and said third gear elements are ring gears.

* * * * *